United States Patent Office 3,183,208
Patented May 11, 1965

3,183,208
INCORPORATING FINELY DIVIDED PARTICLES DURING SUSPENSION POLYMERIZATION
Hans Wolfgang Jurgeleit, Pittsburgh, Pa., assignor to Koppers Company, Inc., a corporation of Delaware
No Drawing. Filed Aug. 22, 1961, Ser. No. 133,028
3 Claims. (Cl. 260—41)

This invention relates generally to polymerization processes and more particularly to a polymerization process whereby finely divided particles of material, other than the polymer, are physically incorporated into the polymer.

One of the more important commercial methods for the production of polymers, such as, polystyrene and styrene copolymers, is suspension or bead polymerization. In this method, the polymerizable monomer is suspended in water, using as the suspension stabilizer a material such as calcium phosphate or polyvinyl alcohol, and polymerized with the aid of a catalyst. The suspension is heated to a temperature sufficient to activate the catalyst. The polymerization product is in the form of grains or beads on the order of 0.5 to 5 millimeters in diameter.

The industrial preference for suspension polymerization is obvious when one considers the rather high heat of polymerization of a monomer such as styrene which, using the suspension method, can be easily dissipated. Another advantage of the suspension process is that the granular product can be easily separated and can be further fabricated and handled with ease.

The beads obtained by suspension polymerization can be and often are further treated by mixing with other materials, such as, pigments, carbon black, etc. Generally, when the beads are to be mixed with another material, the mixing is done by dry-blending, i.e., a tumbling together of beads and additive, to give a reasonably homogeneous mixture of polymer and additive. In cases where it is imperative that the mixture of beads and additive be homogenous, the mixing is accomplished by the more expensive extrusion of the additive and polymer. Both of these mixing processes are time consuming and expensive. It would obviously be advantageous if the beads could be prepared so that, at the completion of the polymerization step, they already contain the additive, such as, a color or pigment, homogenously incorporated therein. The economic advantage of such a step is self-evident.

Materials, which it would be advantageous to incorporate into the polymer, include for instance, bentonite powder, which, according to United States Patent 2,921,042, improves the dyeing properties. Another desirable addition would be the incorporation of powders into polymers which are going to be further fabricated to prepare foamed plastics. It has been reported in the Society of Plastic Engineers Journal, July 1960, pages 705–709, that an improved cell structure is obtained by adding finely dispersed powders which act as nucleating agents during the foaming process. Another advantageous material to incorporate into the polymer would be a pigment to color the plastic. Still other additives would be those which would impart some degree of fire retardancy.

The foregoing materials are of an extremely fine particle size on the order of 0.01 to 100 microns. Additions of these materials have heretofore been made only by extrusion processes because the powdered form is so fine that a dry-blending process would not result in a blend of the required uniformity. Thus, these materials all must be made by extrusion. Unfortunate, even when mixed by an extruder, one pass through the extruder is not always sufficient to obtain a homogeneous distribution of the powder and the plastic material, and often the material must be passed through the extruder two or more times. This extrusion, step although laborous and expensive, has been heretofore the only workable way for incorporating these fine powders into polymers which have been produced by the suspension polymerization method. As would be expected, because of the obvious attendant economic advantages, numerous attempts have been made to add various powders to the suspension polymerization with the hope that these powders would be occluded into the beads during the polymerization process. Unfortunately, however, such process have not been successful. One reason for this nonsuccess is that many of the powders are hydrophilic and although they are not soluble in water, they tend to remain in the water phase to the exclusion of the organic phase. Other of these fine powders, although not hydrophilic, will accumulate in an interlayer between the water phase and the organic phase and act as a suspending agent for the monomer without intruding into the monomer phase. This is, of course, the function of suspending agents in the suspension polymerization process. An example of the former material is sodium bicarbonate, while an example of the latter is finely divided talc such as is used as a suspending agent in the suspension process.

I have now discovered a method wherein it is possible to homogeneously incorporate finely divided solid foreign substances into the beads produced by the suspension polymerization process during the polymerization of the beads. This novel process eliminates the need for any after-mixing of polymer and additive by extrusion or by any other method.

My novel process for the production of beads which contain, homogeneously occluded therein, finely divided foreign substances, contemplates an initial polymerization of at least 30% but less than 85% of a vinyl monomer followed by the addition of finely divided foreign substance, the subsequent establishment of an aqueous suspension of the foreign substance containing partially polymerized monomer, and finally the substantial completion of polymerization.

The first stage of the polymerization may be carried out in bulk or in the presence of water. The presence of water is advantageous in that it helps to dissipate the heat of reaction. This advantage of heat dissipation, however, requires that certain precautions be observed in order to avoid other undesirable effects. For example, if the first part of the polymerization is carried out in the presence of water, the possibility exists that the powder to be incorporated may act as a suspending agent for the monomer being polymerized. If this occurs, the powder cannot be incorporated into the polymer. This undesirable possibility is avoided if the powder is added after polymerization has partially proceeded. The point the polymerization should reach prior to addition is that point where the partially polymerized monomer has agglomerated in the form of a viscous mass. This point occurs after at least 30% of the monomer has been converted to polymer. The polymerization should have proceeded so far as not to permit the partially polymerized monomer to form a suspension on the addition of the powder. The establishment of a suspension may be recognized by the formation of discrete droplets of monomer in the water. If the powder is added after the monomer has agglomerated into a viscous mass, initially the powder will be found both in the water and the monomer. However, with continued agitation, the partially polymerized monomer soon contains all of the powder and the water phase becomes perfectly clear.

The degree of polymerization is related to the viscosity of the polmerizing monomer. For instance, the maximum degree of polymerization which can be tolerated prior to the addition of the additive is about 85%. The viscosity of the polymerizing monomer can be measured with a Gardner Bubble Viscometer and the degree of polymerization determined therefrom. It has been found, for instance, that if the polymerizing monomer is styrene, 85% polymerization corresponds to a Gardner viscosity of approximately Z–8 to 9, determined at 25° C. The viscosity of other partially polymerized monomers may also be related to the degree of polymerization by standard processes so that this degree of polymerization can readily be determined from the viscosity.

Another danger which exists if the initial polymerization is carried out in water is that an emulsion may be formed. The formation of an emulsion can be prevented in several ways. One of the most common methods is to add a salt such as, for example, postassium bromide or sodium chloride.

Salts which may be used to prevent an emulsion are those neutral inorganic salts which are not peptizing agents and which further do not interfere with the polymerization. Suitable salts which meet these criteria are: sodium chloride, potassium chloride, sodium nitrate and potassium sulfate. Salts which cannot be used because they tend to act as stabilizers are the phosphates. Salts which cannot be used because they tend to inhibit polymerization are the heavy metal salts such as those of copper.

If the first part of the polymerization is carried out in water, and a salt is added initially to prevent the formation of an emulsion, some of the below-mentioned suspending agents or thickeners may coagulate. This will happen, for example, with sodium chloride as the salt and polyvinyl alcohol as the thickener. It will be easy for those skilled in the technique of suspension polymerization to avoid these difficulties by proper choice of reactants.

If the first stage of polymerization has been carried out in the presence of sufficient water, the only addition which need be made after the powder which is to be incorporated is added, is that of suspending agent and if desired, polymerization catalyst. If the initial polymerization has been carried out in bulk or in the presence of insufficient water, additional water to insure suspension of the monomer must be added to the suspending agent and catalyst.

The maximum amount of monomer to water is about 55 parts monomer to 45 parts of water. With more than this amount of monomer, a stable suspension cannot be maintained. From an economic point of view, it is desirable that production be as close to this limit as possible because the process becomes progressively uneconomical the further from the maximum you go. From a practical standpoint, the minimum amount of monomer is about 20 parts per 45 parts of monomer.

Any of the well-known suspending agents or thickeners may be used, for example, carbohydrates, e.g., starch, pectin, plant gums, etc., proteinaceous materials, e.g., gelatin and glue, modified celluloses, e.g., methyl cellulose hydroxyethyl cellulose, carboxymethyl cellulose and its salts, etc., synthetic polymeric agents such as polyvinyl alcohol, salts of polyacrylic or polymethacrylic acids, polymethacrylamide, polyvinyl pyrrolidone, etc. The amount of suspending agent varies with the particular system used but is easily ascertainable by experimentation.

If the first part of the polymerization is carried out in the absence of water, the powder to be incorporated may be added at any point up to that point where a stable suspension is established by the addition of sufficient water and suspending agent to establish it, e.g., a Gardner viscosity of Z–9 determined at 25° C.

Generally, a catalyst is added to increase the rate of polymerization. Any of the common polymerization catalysts may be used. For example, a mixture of benzoyl peroxide and tertiary butyl perbenzoate or ditertiary butyl perbenzoate may be used. Other applicable catalyst systems are discussed, for example, in Styrene, Its Polymers, Copolymers and Derivatives, Boundy-Boyer, Reinhold Publishing Corporation, 1952, page 241, et seq.

After establishment of the suspension, the polymerization is carried out in the usual way by continued heating. The process of suspension polymerization is well known and is described, for example, in U.S. Patents 2,656,334 and 2,692,251, as well as in Styrene, Its Polymers, Copolymers and Derivatives, Boundy-Boyer, Reinhold Publishing Corporation. 1952, page 286, et seq.

The beads so produced may be further processed; particularly, they may be rendered expandable. This is accomplished by adding a normally liquid hydrocarbon to a suspension of beads under pressure. The hydrocarbon is forced into the beads which then can be expanded by the application of heat. Such process is described in U.S. Patent 2,983,692, Gaetano F. D'Alelio, assigned to the assignee of the present application.

The following examples more fully illustrate the practice of the invention:

*Example 1*

A two-liter Pyrex glass reaction kettle, equipped with a reflux condenser, a thermowell baffle and a T-shaped stirrer was charged with 500 ml. of water, 200 grams of sodium chloride and a solution of 1 gram benzoyl peroxide and 0.25 gram of tertiary butyl perbenzoate in 500 grams of styrene. The sodium chloride is added to prevent the formation of an emulsion and the benzoyl peroxide and tertiary butyl perbenzoate are polymerization catalysts. The kettle was inserted in an oil bath and heated to 90° C., while agitation was being carried out. A fine dispersion of the monomer in water was created. This dispersion increased in viscosity, eventually lost its identity as a dispersion and assumed the form of a viscous organic layer floating in the water. After about 3 hours at 90° C., at which time about 65% of the monomer had been converted to polymer, 20 grams of antimony oxide, in powder form, was added, while stirring was continued. This powder was absorbed by a viscous layer and remained, even with continued stirring lodged therein. At about one hour after the addition of antimony oxide, the suspending agent, 150 ml. of a 2% aqueous solution of hydroxyethyl cellulose (Cellosize WP-300), was added incrementally. This caused the break-up of the viscous organic layer and its establishment as a suspension in the form of fine droplets of the partially polymerized monomer in the water. Heating of the suspension was continued at 90° C., so that the total polymerization time at this temperature was 7½ hours. Thereafter, the polymerization vessel was closed and polymerization was continued for another 6 hours at a temperature of 115° C. Polymerization was discontinued. The beads formed were separated, washed and dried. Analysis showed that they contained 1.58% antimony oxide. Bead size distribution was determined using a standard Ro-Tap machine and the following bead size distribution was obtained:

| Bead diameter | >2 mm. | >0.84 mm. | >0.59 mm. | >0.42 mm. | <0.42 mm. |
|---|---|---|---|---|---|
| US Standard Sieves | On 10 | On 20 | On 30 | On 40 | Thru 40 mesh screen. |
| Bead distribution | 64.7% | 30.6% | 2.6% | 1.2% | 0.9%. |

*Example 2*

A reaction kettle of the type used in Example 1 was charged with a solution of 600 grams of potassium bromide in 500 ml. of water. Thereafter, 200 grams of sodium bromide was added to the mixture, heated, with stirring, at 70° C. Only a minor portion of the sodium bromide was dissolved. The purpose of the potassium bromide is to prevent the formation of an emulsion, while the sodium bromide is incorporated into the polymer to impart fire retardence thereto. There was then added a solution of 1 gram of benzoyl peroxide and 0.25 gram of tertiary butyl perbenzoate in 500 grams of styrene.

Stirring was continued and the temperature raised to 90° C. in order to disperse the styrene monomer in the water. After about 3½ hours at 90° C., about 70% conversion of monomer to polymer, the dispersion of the styrene was lost and a viscous sticky layer formed. This layer absorbed all of the sodium bromide powder which had not been dissolved in the water phase. After an additional hour's heating at 90° C., 150 ml. of a 2% aqueous hydroxyethyl cellulose solution were added. This caused the breakdown of the organic mass and the formation of the suspension of monomer in water. Heating was continued at 90° C. for 4½ hours to form discrete beads.

In order to carry out further processing, the beads were removed from the reaction kettle and placed in 300 ml. beverage bottles. These bottles were sealed, placed in an oil bath and heated at 115° C. while they were rotated for 6 hours to complete polymerization. In order to produce expandable polystyrene, the bottles were then opened and each was charged with 6 grams of tricalcium phosphate, 0.5 gram Nacconol NRSF (sodium alkyl aryl sulfonate) and 9% by weight of the beads of normal pentane. The bottles were resealed, heated to 100° C. and rotated for another 4 hours. At the end of this period, impregnation was complete. The beads thus obtained were washed with water, with acidified water, and with water again, and finally dried in air. The beads contained 6.4% bromine, predominantly in the form of NaBr. The size distribution of the beads was as follows:

| Bead diameter | >4.76 mm. | >2.0 mm. | >0.84 mm. | >0.59 mm. | <0.59 mm. |
|---|---|---|---|---|---|
| US Standard Sieves | On 4 | On 10 | On 20 | On 30 | Thru 30 mesh screen. |
| Bead distribution | 8.0% | 56.7% | 30.6% | 2.6% | 2.1%. |

The beads were expanded by heating in steam for three minutes. The pre-expanded material was molded under a steam pressure of 1 atm. (15 p.s.i.g.) to a polystyrene foam of a 17.6 g./liter weight (=density of 1.1 lbs./cu. ft.). By analysis, the bromine content in this foam was found to be 4.8%, most of which was present in the form of NaBr.

*Example 3*

A resin kettle as the type used in Example 1 was charged with the solution of 0.25 gram of tertiary butyl perbenzoate and 1.0 gram of dibenzoyl peroxide and 400 grams of styrene. The solution was heated to 90° C. with stirring. After a half-hour at 90° C., about 25% conversion, 3 grams of Red Lake CL-20-5200 was added. Heating was continued for an additional 2½ hours at which time an aqueous solution of 8 grams of hydroxyethyl cellulose in 700 ml. of water was added to establish the suspension. Heating was continued until the hard beads were obtained. This occurred after 8½ hours. At this time, the water phase was found to be substantially colorless, all of the dye having been lodged within the beads. The bead size distribution was determined as in Example 1 and found to be:

| Bead diameter | >2 mm. | >0.84 mm. | >0.59 mm. | >0.42 mm. | <0.42 mm. |
|---|---|---|---|---|---|
| US Standard Sieves | On 10 | On 20 | On 30 | On 40 | Thru 40 mesh screen. |
| Bead distribution | 11.7% | 82.4% | 4.4% | 1.1% | 0.4%. |

*Example 4*

A resin kettle of the type described in Example 1 was charged with 400 ml. of water and 160 grams of sodium chloride. This was heated to 70° C. A solution of 1.0 grams of dibenzoyl peroxide and 0.25 gram of tertiary butyl perbenzoate in 400 grams of styrene monomer was added, while stirring at a speed of 404 r.p.m. The temperature was raised to 90° C. and maintained for 4½ hours, a conversion of about 80%. The monomer had agglomerated into a continuous viscous slurry. Two grams of Heliogen Blue K Toner 56–4107 was added to the reaction vessel, while heating and stirring continued. The pigment was soon entirely occluded within the monomer phase with none left in the water. Thereafter, a solution of 12 grams of hydroxyethyl cellulose in 600 ml. of water was charged to the reaction kettle in order to establish a suspension of the styrene in water. Polymerization was continued at 90° C. with stirring for a period of 8½ hours. The beads produced were of a homogeneously dark blue color. The bead size distribution was determined as in Example 1 and was found to be as follows:

| Bead diameter | >2 mm. | >0.84 mm. | >0.59 mm. | >0.42 mm. | <0.42 mm. |
|---|---|---|---|---|---|
| US Standard Sieves | On 10 | On 20 | On 30 | On 40 | Thru 40 mesh screen. |
| Bead distribution | 61.6% | 35.7% | 2.5% | 0.3% | |

*Example 5*

In order to demonstrate that the time at which the powder to be incorporated into the polymer is of vital importance, a series of experiments were run, wherein the addition was made at distinct times. In each case, a charge of 500 ml. of water, 200 grams of sodium chloride, 500 grams of styrene, 1 gram of dibenzoyl peroxide and 0.25 gram of tertiary butyl perbenzoate was made to a reactor of the type described in Example 1. In each instance, the resulting solution was heated to 90° C. with stirring. The suspension was established using a 2% aqueous solution of hydroxyethyl cellulose. In the first run, the powder to be incorporated was added simultaneously with the establishment of the suspension. In the second run, the powder was added and thereafter the suspension was established. In the third run, the suspension was first established and then the powder added.

| Experiment No. | Hydroxyethyl cellulose | | Ultramarine blue | | Color of final beads |
|---|---|---|---|---|---|
| | Grams | Added after— | Grams | Added after— | |
| I | 1.2 | 0 hours | 2 | 0 hours | Pastel blue. |
| II | 3.0 | 3 hours | 4 | 0 hours | Deep blue. |
| III | 0.8 | 0 hours | 4 | 3 hours | Colorless. |

The results given in the table indicate clearly that in order to get a homogeneous distribution of the powder within the polymer, the powder must be added prior to the establishment of the suspension. If the powder is added at the same time the suspension is established, only part of the powder will be occluded. Whereas, if the suspension is established prior to the addition of the powder, no occlusion at all will occur.

In each instance, the polymerization was carried out for 9 hours beyond that shown in the table.

*Example 6*

A series of four polymerizations were carried out in resin kettles such as described in Example 1. To each kettle, there was charged 500 ml. of water, a solution of 1 gram of dibenzoyl peroxide and 0.25 gram of tertiary butyl perbenozate in 500 grams of styrene monomer. To Kettles 1 and 2, there was also added 200 grams of sodium chloride. In each instance, polymerization was carried out by heating to 90° C. while stirring. After 3 hours at 90° C., the temperature was lowered to about 65° C., and the following additions were made:

To Kettle 1—50 grams of an ethoxylated starch
To Kettle 2—50 grams of a crude corn starch
To Kettle 3—25 grams of an ethoxylated starch
To Kettle 4—25 grams of a crude corn starch In each instance, the starch was picked up rapidly by the monomer phase, leaving the water phase clear. Upon absorption of the starch by the monomer phase, the temperature was again raised to 90° C. over approximately ¾ hour. After an additional hour at this temperature, 650 ml. of a 2% aqueous hydroxyethyl cellulose solution was added to Kettles 1, 3 and 4, while 400 ml. of this solution were added to Kettle 2. In each instance, this was sufficient hydroxyethyl cellulose to establish a suspension. In all instances, polymerization was completed by heating to 90° C. for a total of about 9 hours. At the completion of polymerization, the beads were recovered, washed, rinsed and dried. The beads from Kettles 1 and 3 were white, while those from 2 and 4 were brownish due to the brown color of the starch used. No starch was detectable in the water phase of any of the four kettles.

Example 6 was repeated except that the temperature was not decreased to 65° C. when the starch additions were made. As a result, the starch swelled to give a syrup which dispersed the polymerizing mass in the water. As a result, no starch was occluded in the styrene phase.

*Example 7*

A resin kettle of the type used in Example 1 was charged with a solution of 0.8 gram of debenzoyl peroxide and 0.2 gram of tertiary butyl perbenzoate in 400 grams of styrene. To this solution, there was added 2.5 grams of finely divided sodium bicarbonate. Heating to 90° C. was accomplished and the solution was held at this temperature for 4 hours while undergoing stirring. By this time, the styrene was transformed into a viscous syrup in which the sodium bicarbonate was finely dispersed. The syrup was then transferred to another resin kettle which contained the solution of 4 grams of hydroxyethyl cellulose and 600 ml. of water, which had been preheated to 90° C. The syrup was added to this solution and a stable suspension resulted. Polymerization was then continued for a time sufficient to result in hard beads. The sodium bicarbonate was homogeneously contained throughout the beads. The bead size distribution was performed as in Example 1 and the beads had the following distribution:

| Bead diameter | >2 mm. | >0.84 mm. | >0.59 mm. | >0.42 mm. | <0.42 mm. |
|---|---|---|---|---|---|
| US Standard Sieves | On 10 | On 20 | On 30 | On 40 | Thru 40 mesh screen. |
| Bead distribution | 2.5% | 45.0% | 25.2% | 14.3% | 13.0%. |

The above example is indicative of the fact that it is not necessary that the initial polymerization be carried out in the presence of water but that an initial bulk polymerization may be suspended with excellent results.

*Example 8*

Example 7 was repeated with the exception that 3 grams of Permanent Carmine FR Toner 35–5001 was substituted for the 25 grams of sodium bicarbonate used in Example 7 and the first stage of polymerization was carried out for 3 rather than 4 hours. Homogeneously dark red beads were produced. These beads had a particle size distribution as follows:

| Bead diameter | >2 mm. | >0.84 mm. | >0.59 mm. | >0.42 mm. | <0.42 mm. |
|---|---|---|---|---|---|
| US Standard Sieves | On 10 | On 20 | On 30 | On 40 | Thru 40 mesh screen. |
| Bead distribution | 3.0% | 96.3% | 0.5% | 0.1% | 0.1%. |

*Example 9*

A dry glass lined 35-liter reactor equipped with stirrer, steam jacket, thermowell baffle, was charged with 8 kilograms of styrene, 16 grams of dibenzoyl peroxide and 4 grams of tertiary butyl perbenzoate. The mixture was agitated and after ten minutes, 160 grams of Red Lake CL–20–5200 was added. The reactor was heated to 90° C. for 3 hours. There was then added 120 grams of hydroxyethyl cellulose in 14 liters of water. This was sufficient to form a bead suspension of the polymerizing styrene in the water hydroxyethyl cellulose mixture. Heating was continued for another 3 hours at 90° C. at which time the reactor was closed. At this point, 1.2 liters of a 1:1 mixture of normal and isopentane was pressured into the closed reactor. The temperature was held at 90° C. for a total of 8 hours. After this, the temperature was raised to 115° C. and held for 5 hours. The pressure was maintained throughout at 66 to 68 p.s.i.g. The reactor was then cooled down to room temperature. The beads were recovered, washed dried. The beads were of a deep red color and contained 6.3% pentane. Seventy-five percent of the beads had a diameter of 2 to 4 mm. The portion of the beads were heated in steam at 100° C. for 3 to 4 minutes to give partially expanded beads having a density of 16 grams per liter, about one pound per cubic foot. These beads were then molded into a 30 centimeter x 30 centimeter x 30 centimeter foam block using pressurized steam at 20 p.s.i.g.

It is to be noted in contrast to Example 7 above, that in this instance, the water suspending agent was added to the styrene rather than the styrene to the water. The order in which this is done is thus shown to be immaterial.

*Example 10*

A solution of 1 gram of benzoyl peroxide, 0.25 gram of tertiary butyl perbenzoate in 500 grams of styrene was added to a polymerization kettle of the type described in Example 1, which kettle contained 500 ml. of water. There was thereafter added 200 grams of sodium chloride. This mixture was heated for 3½ hours at 90° C. There was then added 20 grams of potassium fluoroborate, which had been ground to a fine power. The potassium fluoroborate was coated with 0.2% by weight ammonium stearate so that the potassium fluoroborate would not stick and coagulate in the presence of water. The potassium fluoroborate only partially dissolved in the water. The remainder was rapidly picked up by the polymerizing mass. Within 15 minutes, the water phase was perfectly clear and there was added 200 ml. of a hot, 2% aqueous solution of hydroxyethyl cellulose. Polymerization was continued by heating at 90° C. for a total of 9 hours. The polymerization of the charge of the kettle was then transferred to 300 ml. crown capped bottles and polymerization was completed in the bottles by heating them at 115° C. for another 6 hours. Flat, oblong beads were obtained, having the following bead size distribution:

| Bead diameter | >4.76 mm. | >3.36 mm. | >2.0 mm. | >0.84 mm. | <0.84 mm. |
|---|---|---|---|---|---|
| US Standard Sieves | On 4 | On 6 | On 10 | On 20 | Thru 20 mesh screen. |
| Bead distribution | 1.5% | 6.0% | 80.9% | 17.7% | 0.0%. |

The beads were recovered, washed and then charged into 300 ml. bottles, each bottle containing 60 grams of beads, 150 ml. of water, 50 mg. of Nacconol NRSF (sodium alkyl aryl sulfonate), 6 grams of zinc oxide and 9 ml. of normal-pentane. The bottles were then sealed with crown caps and heated in an oil bath at 100° C. for 4 hours, while undergoing rotation. At the completion of this time, the beads were recovered, washed and dried. They were found to have a pentane content of about 6.7% and were expanded into a foam having a density of one pound per cubic foot. Chemical analysis showed that 9.4% potassium fluoroborate was contained in the foam.

*Example 11*

Two resin kettles of the type described in Example 1 were each charged with 350 ml. of water and 150 grams of sodium chloride. A solution of 1.2 grams of dibenzoyl peroxide and 0.3 gram of tertiary butyl perbenzoate in 600 grams of styrene monomer was added to one kettle, A, while a solution of 1.1 grams of dibenzoyl peroxide and 0.28 gram of tertiary butyl perbenzoate in 500 grams of styrene monomer was added to the other kettle, B. The kettle contents were heated at 90° C. with stirring. After 3 hours at 90° C., corresponding to a conversion of about 65%, 4 grams of Red Lake CL-20-5200 was added to each reaction vessel, while heating and stirring continued. The pigment was soon entirely occluded within the monomer phase with none left in the water. After one-half hour, a hot solution of 3 grams of hydroxyethyl cellulose in 150 ml. of water was charged to each of the reaction kettles in order to establish a suspension of the polymerizing styrene in water. Polymerization was continued at 90° C., with stirring, for a period of 11 hours. The beads produced were of a homogeneously red color. The bead size distribution was determined as in Example 1 and was found to be as follows:

methyl methacrylate. This mixture was heated at 85° C. while stirring at a speed of 400 r.p.m. After one hour's heating at 85° C., the partially polymerized methyl methacrylate formed a continuous viscous layer floating on top of the water. At this time, 4 grams of Red Lake CL-20-5200 was added to the kettle. This color pigment was absorbed by the partially polymerized monomer in about one minute, leaving no pigment in the water. Heating and stirring was continued for another 15 minutes after which a hot solution of 3 grams hydroxyethyl cellulose in 150 ml. of water was added in order to disperse the organic layer in the form of globules. Polymerization was continued by heating at 85° C. for a total of 6 hours. Deep red beads of polymethyl methacrylate were obtained, having the following bead size distribution:

| Bead diameter | >2 mm. | >0.84 mm. | >0.59 mm. | >0.42 mm. | <0.42 mm. |
|---|---|---|---|---|---|
| US Standard Sieves | On 10 | On 20 | On 30 | On 40 | Thru 40 mesh screen. |
| Bead distribution | 42.9% | 48.9% | 5.3% | 2.3% | 0.6%. |

In addition to styrene, styrene derivatives such as, dichlorostyrene and alphamethyl styrene may also be polymerized according to the above process. Additionally, other monomeric substances polymerizable by the suspension process such as acrylic and methacrylic esters, itaconic acid and its esters, fumaric and maleic esters, and mixtures of two or more of these monomers, as well as combinations of any of these above previously named monomers, with less than 50% by weight of other comonomers polymerizable under the suspension conditions, such as acrylic acid and acrylonitrile may also be copolymerized according to the process of the invention.

In addition to the materials above described in the examples, there may be incorporated into the polymerizing polymer, according to the process of the present invention, a great variety of other finely divided solid materials; for instance, inorganic insoluble materials such as fuller's earth, bentonite, magnesium silicate, calcium carbonate, calcium phosphate, etc., inorganic color pigments such as titanium dioxide, zinc oxide, iron oxide, chromium yellow, ultramarine blue, aluminum bronze, etc. Also water soluble salts, either inorganic or organic, may be incorporated by adding them in the form of a fine powder to the monomer and carrying out the first part of the polymerization in bulk. In grinding up these salts to powders, it may be helpful to add minor amounts of materials such as ammonium stearate which prevent agglomeration and at the same time are helpful in dispersing the salt in the monomer. Water soluble inorganic salts which may be incorporated by this manner are sodium

| Bead diameter | >2 mm. | >0.84 mm. | >0.59 mm. | >0.42 mm. | <0.42 mm. |
|---|---|---|---|---|---|
| US Standard Sieves | On 10 | On 20 | On 30 | On 40 | Thru 40 mesh screen. |
| KETTLE A |  |  |  |  |  |
| Bead distribution | 2.4% | 95.0% | 1.5% | 0.5% | 0.6%. |
| KETTLE B |  |  |  |  |  |
| Bead distribution | 1.4% | 82.7% | 14.1% | 0.6% | 1.2%. |

*Example 12*

A resin kettle as described in Example No. 1 was charged with 600 ml. of water, 180 grams of sodium chloride and a solution of 0.6 gram dibenzoyl peroxide and 0.15 gram of tertiary butyl perbenzoate in 300 grams chloride, sodium bromide, sodium carbonate, potassium bicarbonate, sodium sulfate, etc. Also, there may be included organic compounds which are insoluble in styrene. Examples of these materials are highly chlorinated hydrocarbons, phthalocyanine pigments, color toners and lakes, i.e., organic pigment precipitated on an absorptive or reactive substratum.

The foregoing has described a novel process for the incorporation of foreign substances into polymerizing monomer by dispersing the powder in a partially polymerized monomer and then creating a suspension of the partially polymerized monomer and finishing the polymerization by this suspension process.

I claim:

1. A process for homogeneously incorporating finely divided solid substances in beads of normally solid vinyl polymers comprising:
   (a) partially polymerizing a vinyl monomer selected from the group consisting of styrene monomer and acrylic monomer to convert at least 30 but not more than 85 percent of said monomer to polymer,
   (b) incorporating an inert finely divided solid substance in said partially polymerized monomer,
   (c) forming an aqueous suspension of said partially polymerized monomer having said finely divided substance incorporated therein, and
   (d) substantially completing the polymerization of said suspended partially polymerized monomer.

2. A process for making colored polystyrene beads comprising partially polymerizing styrene monomer dispersed in an aqueous medium in the absence of suspending agent to convert from 30 to 85 percent of said styrene to the polymer, physically incorporating an inert finely divided solid pigment into said partially polymerized styrene, forming an aqueous suspension of said partially polymerized styrene having said pigment incorporated therein, and substantially completing the polymerization of said partially polymerized styrene to form colored beads.

3. A process for making colored expandable polystyrene beads comprising partially polymerizing styrene monomer dispersed in an aqueous medium in the absence of suspending agent to convert from 30 to 85 percent of said styrene to the polymer, physically incorporating an inert finely divided solid pigment into said partially polymerized styrene, forming an aqueous suspension of said partially polymerized styrene having said pigment incorporated therein, substantially completing the polymerization of said partially polymerized styrene to form colored beads, and introducing into said colored beads a normally liquid blowing agent.

References Cited by the Examiner

UNITED STATES PATENTS

| | | | |
|---|---|---|---|
| 2,489,226 | 11/49 | Morris et al. | 260—41 |
| 2,512,697 | 6/50 | Te Grotenhuis | 260—41.5 |
| 2,751,369 | 6/56 | Te Grotenhuis | 260—41 |
| 2,848,428 | 8/58 | Rubens | 260—2.5 |
| 2,986,547 | 4/61 | Jefts | 260—41 |

MORRIS LIEBMAN, *Primary Examiner.*

LEON J. BERCOVITZ, *Examiner.*